United States Patent
Chen et al.

(10) Patent No.: US 12,122,359 B2
(45) Date of Patent: Oct. 22, 2024

(54) COORDINATED CONTROL METHOD FOR ELECTRIC VEHICLES HAVING INDEPENDENT FOUR-WHEEL DRIVING AND STEERING

(71) Applicant: Tongji University, Shanghai (CN)

(72) Inventors: Hong Chen, Shanghai (CN); Lin Zhang, Shanghai (CN); Rongjie Yu, Shanghai (CN); Hanghang Liu, Shanghai (CN)

(73) Assignee: tongji University

( * ) Notice: Subject to any disclaimer, the term of this patent is extended or adjusted under 35 U.S.C. 154(b) by 0 days.

(21) Appl. No.: 18/381,352

(22) Filed: Oct. 18, 2023

(65) Prior Publication Data

US 2024/0270235 A1  Aug. 15, 2024

(51) Int. Cl.
| | |
|---|---|
| *B60W 30/02* | (2012.01) |
| *B60L 15/20* | (2006.01) |
| *B60W 10/08* | (2006.01) |
| *B60W 10/119* | (2012.01) |
| *B60W 10/20* | (2006.01) |
| *B60W 40/114* | (2012.01) |

(52) U.S. Cl.
CPC ............ *B60W 30/02* (2013.01); *B60L 15/20* (2013.01); *B60W 10/08* (2013.01); *B60W 10/119* (2013.01); *B60W 10/20* (2013.01); *B60W 40/114* (2013.01); *B60L 2240/463* (2013.01); *B60W 2510/222* (2013.01); *B60W 2520/10* (2013.01); *B60W 2520/14* (2013.01); *B60W 2520/20* (2013.01); *B60W 2520/30* (2013.01); *B60W 2710/207* (2013.01); *B60W 2720/30* (2013.01)

(58) Field of Classification Search
CPC .................................................... B60W 30/02
See application file for complete search history.

(56) References Cited

U.S. PATENT DOCUMENTS

| | | | | |
|---|---|---|---|---|
| 2012/0024605 | A1* | 2/2012 | Elinas | G06Q 10/06 175/57 |
| 2022/0144324 | A1* | 5/2022 | Wu | B61L 15/0062 |

FOREIGN PATENT DOCUMENTS

| | | | | |
|---|---|---|---|---|
| CN | 107131296 | A | * | 9/2017 |
| CN | 107131296 | B | * | 1/2019 |

(Continued)

*Primary Examiner* — Shelley Chen
(74) *Attorney, Agent, or Firm* — Jose Cherson Weissbrot (57) ABSTRACT

A coordinated control method for electric vehicles having independent four-wheel driving and steering, comprising the steps of: calculating to obtain a desired value of yaw velocity according to the steering angle and the current vehicle driving speed, and limiting the desired value of yaw velocity according to the current road adhesion condition; constructing an optimization problem according to the current vehicle motion state and the desired value of yaw velocity, and solving the optimization problem to obtain a desired active rear wheel steering angle control variable and a desired additional yaw moment control variable; calculating to obtain an additional torque of each wheel according to a desired additional yaw moment control variable, obtaining a desired active rear wheel steering angle, and sending the additional torque of each wheel and the desired active rear wheel steering angle to an executor of the vehicle for performing a coordinated control.

10 Claims, 5 Drawing Sheets

(56) References Cited

FOREIGN PATENT DOCUMENTS

| CN | 114527768 | A | * | 5/2022 | | |
|---|---|---|---|---|---|---|
| CN | 114706412 | A | * | 7/2022 | | |
| CN | 115593600 | A | * | 1/2023 | | |
| CN | 114527768 | B | * | 6/2023 | | |
| FR | 3127928 | A1 | * | 4/2023 | ............... | B60K 6/48 |
| FR | 3127930 | A1 | * | 4/2023 | ............... | B60K 6/48 |

* cited by examiner

COORDINATED CONTROL METHOD FOR ELECTRIC VEHICLES HAVING INDEPENDENT FOUR-WHEEL DRIVING AND STEERING

TECHNICAL FIELD

This invention generally relates to the technical field of electric vehicle control, and more particularly, to a coordinated control method for electric vehicles having independent four-wheel driving and steering.

BACKGROUND

A vehicle having independent four-wheel driving and steering is a special vehicle whose moment of four wheels and steering angle of the front and rear axles are capable of being adjusted by means of installing distributed driving motors on the vehicle and independent steering motors on front and rear axles. Through the active steering, a side slip angle of the vehicle is directly controlled such that the wheel lateral force of the vehicle is further controlled. It can be seen that, by introducing the active steering, a control variable is added, allowing the flexibility and safety of vehicle control to be significantly improved. Meanwhile, the introduction of distributed driving motors enables the moment of four wheels to be directly adjusted. Therefore, under extreme working conditions, compared with conventional vehicles, the safety of vehicles having independent four-wheel driving and steering is greatly enhanced, achieving a wider application range. However, because a vehicle is a complex nonlinear system, and especially, under extreme working conditions, the wheel force reaches the limit, which makes the nonlinear properties of the vehicle more prominent. Moreover, due to the addition of the control variables, the complexity of the vehicle model is further increased, and the coupling relationship among the control variables and state variables becomes more complex. Therefore, when designing a controller, it is necessary to fully consider the complex nonlinear and coupling properties of the vehicle, as well as the coordination problem under the simultaneous action of a plurality of control variables. Under extreme working conditions, because the stable driving area of a vehicle is small, to ensure the stability of the vehicle, the state of the vehicle in a future period needs to be reasonably predicted and potential safety risks need to be found. Therefore, in the whole process, the strong nonlinear and coupling properties of the vehicle system, the safety constraints of the vehicle, as well as the control constraints of the vehicle need to be taken into account. To solve the aforesaid problem, prediction coordination control is an ideal method. By means of this method, an original control problem is converted into a nonlinear optimization problem under the constraints, and the nonlinear optimization problem is solved through a nonlinear planning method. However, under the existing technical conditions, the calculation power of the vehicle-mounted controller is limited, resulting in the failure of solving the optimization problem in time. Further, a vehicle is a quick-varying system, so that the failure of obtaining a corresponding control variable may lead to the poor stability of the vehicle. In conclusion, under extreme working conditions, the main problems of the prediction coordination control for vehicles having independent four-wheel driving and steering are the following:

1. Compared with under normal working conditions, the nonlinear properties of a vehicle under extreme working conditions are more prominent; to improve the control performance, a nonlinear model is normally adopted for modelling the action of the control variables; however, under extreme working conditions, the nonlinear model inevitably introduces errors, which affects the further improvement of the control performance;

2. Conventional methods do not take into account the coupling of a plurality of control variables of vehicles having independent four-wheel driving and steering; under extreme working conditions, if the coordination and conflict among the plurality of control variables are not taken into account, the control effect may be affected, resulting in the poor stability of vehicles;

3. Because a nonlinear vehicle model is adopted to improve the model accuracy, an optimization problem that needs to be solved is also a nonlinear optimization problem; if a conventional direct optimization method such as the SQP (sequential quadratic programming) method or IPOPT method is used, the required solving time may greatly exceed the control period of the vehicle, resulting in the failure of obtaining the optimal control variable in time; thus, it cannot be applied to a vehicle-mounted controller;

Chinese patent CN202011114070.1 discloses a fast real-time rear wheel active steering prediction control method. In this patent, to facilitate the solving process, a linear wheel model is adopted as the rear wheel model of a vehicle. In fact, the wheel forces of a vehicle are longitudinally and laterally coupled, and the rear wheel steering angle is directly optimized by a controller. However, due to the adoption of the linear wheel model, errors of the model become inevitable, leading to a poor control effect of the method. Moreover, in this patent, a simplex optimization algorithm is adopted to solve an optimization problem, which may result in a local optimal solution during use, failing to achieve an exploration of a global optimal solution.

SUMMARY

The purpose of the present invention is to provide a coordinated control method for electric vehicles having independent four-wheel driving and steering.

To achieve the above purpose, the present invention adopts the following technical solution: a coordinated control method for electric vehicles having independent four-wheel driving and steering, comprising the steps of:

calculating to obtain a desired value of yaw velocity according to the steering angle and the current vehicle driving speed, constructing an original optimization problem according to the current vehicle motion state and the desired value of yaw velocity, wherein the objective function of the original optimization problem is used for tracking the yaw velocity, inhibiting the mass center side slip angle, and adjusting the active rear wheel steering angle and the additional yaw moment control variable in a coordinated manner, solving the optimization problem to obtain a desired active rear wheel steering angle control variable and a desired additional yaw moment control variable, calculating to obtain an additional torque of each wheel according to a desired additional yaw moment control variable, obtaining a desired active rear wheel steering angle according to a desired lateral force control variable, and sending the additional torque of each wheel and the desired active rear wheel steering angle to an executor of the vehicle for performing a coordinated control;

The fast solving of the original optimization problem, comprising the steps of:
converting a to-be-optimized problem into an explicit solving problem based on the Pontryagin's Minimum Principle,
finding an initial value of an optimal co-state variable by means of particle swarm optimization, and
indirectly solving the original optimization problem based on the initial value of the optimal co-state variable.

In another embodiment of the present invention, a second-order reference model is used to generate a desired yaw velocity, wherein a transfer function from the front wheel steering angle $\delta_f$ to the desired yaw velocity $\gamma_{ref}$ may be expressed as the following equation:

$$\frac{\gamma_{ref}}{\delta_f} = K_\gamma \frac{1 + \tau_\gamma s}{\frac{1}{\omega_n^2}s^2 + \frac{2\zeta}{\omega_n}s + 1}$$

wherein $\omega_n$, $\zeta$, $K_\gamma$ and $\tau_\gamma$ respectively represent the natural oscillation frequency, the damping coefficient, the yaw velocity gain, and the differential coefficient of yaw velocity, which may be calculated by using the following equation:

$$\omega_n = \frac{2}{V}\sqrt{\frac{C_f C_r(L - KV^2)}{mI_z}}$$

$$\zeta = \frac{m(C_f L_f^2 + C_r L_r^2) + (C_f + C_r)I_z}{2\sqrt{LmI_z C_f C_r(L - KV^2)}}$$

$$K_\gamma = \frac{V}{L + KV^2}$$

$$\tau_\gamma = \frac{mVL_f}{2C_r L}$$

wherein in the aforesaid equation $K = -m(C_f L_f - C_r L_r)/2C_f C_r L$ is defined as a understeering gradient, and $L = L_f + L_r$ is defined as the front-rear wheelbase of the vehicle, wherein $L_f$ and $L_r$ respectively represent the distances from the front and rear axles to the mass center of the vehicle, wherein V represents the longitudinal speed of the vehicle, wherein m represents the mass of the vehicle, wherein $I_z$ represents the moment of inertia of the vehicle rotating around the mass center, wherein $C_f$ and $C_r$ respectively represent the front wheel cornering stiffness and rear wheel cornering stiffness, wherein the upper limit value of the yaw velocity is defined as $$\gamma_{up} = \left|\frac{\mu g}{V}\right|,$$

and the constraint that the real value of the yaw velocity should satisfy is $|\delta_{ref}| \le \gamma_{up}$.

In another embodiment of the present invention, the original optimization problem further comprising:
an objective function for tracking the yaw velocity, inhibiting the mass center side slip angle, and adjusting the active rear wheel steering angle and the additional yaw moment control variable in a coordinated manner;
and establishing an objective function constraint according to the vehicle safety constraint, the actuator constraint and the real-time driving state, wherein the optimization problem is expressed as follows:

$$\min J = \sum_{k_i=k+1}^{k+N+1} [\Gamma_\gamma L_1(k_i) + \Gamma_\beta L_2(k_i) + \Gamma_{u1} L_3(k_i) + \Gamma_{u2} L_4(k_i)]$$

$$\text{s.t.} \quad -1 \le x_1(k_i) \le 1$$

$$\Delta F_{yr,min} \le u_1(k_i) \le \Delta F_{yr,max}$$

$$-1 \le u_2(k_i) \le 1$$

wherein in the aforesaid, $L_1(k_i)$ and $L_2(k_i)$ respectively represent subitems of the objective function of the yaw velocity and the mass center side slip angle tracking item at the moment $k_i$, wherein $L_3(k_i)$ and $L_4(k_i)$ respectively represent subitems of the objective function of the active rear wheel steering angle control variable $u_1$ and the additional yaw moment control variable $u_2$ at the moment $k_i$, wherein $\Gamma_\gamma$ and $\Gamma_\beta$ respectively represent the weight coefficient of the yaw velocity tracking item and the weight coefficient of the mass center side slip angle tracking item, wherein $\Gamma_{u1}$ and $\Gamma_{u2}$ respectively represent weight coefficients of the additional yaw moment control variable $u_1$ and the additional yaw moment control quantity $u_2$, wherein $x_1(k_i)$ represents a mass center side slip angle tracking item of the vehicle, wherein $u_1(k_i)$ and $u_2(k_i)$ respectively represent an additional yaw moment control variable and an additional yaw moment control variable, and wherein $\Delta F_{yr,min}$ and $\Delta F_{yr,max}$ respectively represent the minimum and maximum values of the additional portion of the lateral force of the rear wheel.

In another embodiment of the present invention, the subitems of the objective function for tracking the yaw velocity and the mass center side slip angle at each moment $k+1 \le k_i \le k+N+1$ are defined as follows:

$$L_1(k_i) = (x_2(k_i) - \gamma_{ref}/\gamma_{up})^2$$

$$L_2(k_i) = (x_1(k_i) - \beta_{ref}/\beta_{up})^2$$

wherein N represents the size of the prediction time domain, wherein $x_1(k_i)$ and $x_2(k_i)$ respectively represent a mass center side slip angle tracking item and a yaw velocity tracking item of the vehicle, wherein the yaw velocity upper limit value is defined as $$\gamma_{up} = \left|\frac{\mu g}{V}\right|,$$

wherein the desired yaw velocity satisfies the constraint $|\gamma_{ref}| \le \gamma_{up}$, wherein the desired mass center side slip angle is defined as $\beta_{ref} = 0$, the mass center side slip angle upper limit value is defined as $$\beta_{up} = \left|\mu g\left(\frac{L_r}{V^2} + \frac{mL_f}{C_r L}\right)\right|,$$

and the constraint that the mass center side slip angle meets is defined as $|\beta| \leq \beta_{up}$, wherein the subitems of the objective function of the additional yaw moment control variable $u_1$ and the additional yaw moment control variable $u_2$ are:

$$L_3(k_i) = u_1(k_i - 1)^2$$

$$L_4(k_i) = u_2(k_i - 1)^2$$

In another embodiment of the present invention, obtaining the mass center side slip angle tracking item $x_1$ ($k_i$) and the yaw velocity tracking item $x_2$ ($k_i$) of the vehicle based on a discrete vehicle two-degree-of-freedom self-driving model, comprising the steps of:

defining a state vector of the system as $x=[x_1, x_2]^T[\beta/\beta_{up}, \gamma/\gamma_{up}]^T$, wherein $\beta$ and $\gamma$ respectively represent the mass center side slip angle of the vehicle and the yaw velocity of the vehicle, and $\gamma_{up}$ and $\beta_{up}$ respectively represent the yaw velocity upper limit value and the mass center side slip angle upper limit value;

defining the control input of the system is a normalized form $u=[u_1, u_2]^T=[\Delta F_{yr}, \Delta M_z/\Delta M_{max}]^T$, wherein $\Delta F_{yr}$ represents the additional portion of the rear wheel lateral force, $\Delta M_z$ represents the additional yaw moment, and $\Delta M_{max}$ represents the maximum value of the additional yaw moment, wherein the following is obtained by the discrete vehicle two-degree-of-freedom self-driving model:

$$x_1(k+1) = T_s \frac{F_{yf}(k) + \tilde{F}_{yr}(k) + u_1(k)}{mV\beta_{up}} + x_1(k) - T_s \frac{\gamma_{up}}{\beta_{up}} x_2(k)$$

$$x_2(k+1) = T_s \frac{L_f F_{yf}(k) - L_r[\tilde{F}_{yr}(k) + u_1(k)]}{\gamma_{up} I_z} + x_2(k) + \frac{\Delta M_{max} T_s}{\gamma_{up} I_z} u_2(k)$$

wherein $T_s$ represents the discrete duration of the system, wherein $L_f$ and $L_r$ respectively represent the distances from the front and rear axles to the mass center of the vehicle, wherein m represents the mass of the vehicle, wherein $I_z$ represents the moment of inertia of the vehicle rotating around the mass center, wherein V represents the longitudinal speed of the vehicle, wherein the lateral force of the front wheel $F_{yf}$ and the standard portion of the lateral force of the rear wheel $\tilde{F}_{yr}$ are calculated by using the nonlinear wheel model.

In another embodiment of the present invention, the nonlinear wheel model uses a nonlinear Fiala wheel model, making $\tan(\alpha) \approx \alpha$, and the nonlinear wheel model is expressed as follows:

$$F_y = \begin{cases} -C_\alpha \alpha + \frac{C_\alpha^2}{3\mu F_z} |\alpha|\alpha - \frac{1}{3} \frac{C_\alpha^3}{(3\mu F_z)^2} \alpha^3, & |\alpha| \leq \arctan\left(\frac{3\mu F_z}{C_\alpha}\right) \\ -\mu F_z \, \text{sgn } \alpha, & \text{otherwise} \end{cases}$$

wherein $\mu$ is a road adhesion coefficient, $F_z$ is a vertical load, $C_\alpha$ is a wheel cornering stiffness, $\alpha$ is a wheel side slip angle divided into a front wheel side slip angle $\alpha_f$ and a rear wheel side slip angle $\alpha_r$, which are respectively calculated by the following:

$$\alpha_f = \beta + \frac{L_f}{V}\gamma - \delta_f$$

-continued $$\alpha_r = \beta - \frac{L_r}{V}\gamma - \delta_r$$

where $\beta$ and $\gamma$ respectively represent the mass center side slip angle and the yaw angle velocity of the vehicle, wherein $L_f$ and $L_r$ respectively represent the distance from the front axle to the vehicle center, wherein V represents the longitudinal speed of the vehicle, and wherein $\delta_f$ and $\delta_r$ respectively represent the front wheel steering angle and the rear wheel steering angle of the vehicle.

In another embodiment of the present invention, specifically, solving the optimization problem, comprising the steps of:

introducing a relaxation factor, and converting the state constraint, constructing a corresponding Hamiltonian function according to the objective function and the vehicle system state-space equation, deriving an explicit optimal control variable expression according to a binary function minimum value principle, and then deriving an iterative relationship and a terminal condition of the Hamiltonian equation according to an extremum principle, and finding out an initial value of an optimal costate variable, and obtaining an optimal control input sequence in an explicit iteration manner based on the optimal initial value.

In another embodiment of the present invention, finding out the initial value of the optimal costate variable by means of particle swarm optimization, comprising the steps of:

initializing the particle swarm: giving the position of an initial point; generating a plurality of initial particles near the initial point and setting the speed of the initial point; according to the analytical solution of the explicit optimal control variable, performing a calculation of convergence value on the particles in the initial particle swarm by means of the iteration relationship of the Hamiltonian equation, finding out the best point and the worst point in the whole particle swarm after the calculation is completed, and respectively recording the corresponding convergence values; setting a historical best point of each particle as a current position of the initial point, and defining the number of the current iterations to be 0;

updating the particle swarm: updating the speed and position of the historical best point of the particle swarm according to the historical best point of each particle;

updating the particle swarm convergence value: reperforming the convergence value calculation on the particle swarm, wherein during the calculation, if the convergence value of the i-th particle is lower than the current optimal value of the i-th particle, the position of the historical best point is updated to the current particle position, and if not, the position of the historical best point remains unchanged, wherein after the calculation of all the particle convergence values is completed, the best point of the particle swarm is updated to the position of the smallest particle in all the current particle convergence values, and the worst point of the particle swarm is updated to the position of the largest particle in all the current particle convergence values, wherein the number of current iterations is increased by one;

judging the termination conditions: setting termination conditions as follows:

$$\lambda(P_{w,g}) > \lambda(P_{b,g}) + \varepsilon \text{ and } I_c < I_{max}$$

$$I_c < I_{min}$$

wherein $\lambda(P_{b,g})$ and $\lambda(P_{w,g})$ respectively represent a final convergence value obtained in the convergence value calculation when the best point and the worst point of the particle swarm are used as Lagrange multiplier initial values, wherein $\varepsilon$ represents the tolerance, wherein $I_c$ represents the number of iterations, wherein $I_{max}$ and $I_{min}$ respectively represent the set maximum number of iterations and the minimum number of iterations, wherein after the update completed, the termination conditions are judged, and if one of the conditions is satisfied, it indicates that the search process is not completed, and then returns to the particle swarm to continue the iteration, wherein if none of the above two conditions is satisfied, it indicates that the search process is completed, and meanwhile, the best point of the current particle swarm is output as the optimal Lagrange multiplier initial value.

In another embodiment of the present invention, an additional yaw moment is generated in an average distribution manner, wherein according to the optimal additional yaw moment control variable input $u^*_2(k)$ obtained by solving the optimization problem, the torque allocated to each motor is obtained as follows:

$$\Delta T_{cfl}(k) = \Delta T_{crl}(k) = -\frac{u^*_2(k) \Delta M_{max}}{d} R_e \qquad (1)$$

$$\Delta T_{cfr}(k) = \Delta T_{crr}(k) = \frac{u^*_2(k) \Delta M_{max}}{d} R_e$$

wherein $\Delta T_{cfl}$, $\Delta T_{crl}$ respectively represent the additional torques of the left front wheel and the rear wheel, wherein $\Delta T_{cfr}$, $\Delta T_{crr}$ respectively represent the additional torques of the right front wheel and the rear wheel, wherein represents the maximum value of the additional yaw moment, wherein $R_e$ represents the effective rolling radius of the wheel, and wherein d represents the width of the vehicle body.

In another embodiment of the present invention, obtaining the desired active rear wheel steering angle according to the desired lateral force control variable, comprising the steps of:
constructing a wheel lateral force MAP chart according to the wheel model, wherein the three axes in the MAP chart respectively represent the wheel lateral force, the wheel side slip angle and the vertical load,
obtaining a corresponding wheel side slip angle by using a look-up-table method according to the vertical load of the wheel and the desired wheel lateral force, and obtaining a desired active rear wheel steering angle:

$$\delta_{r,ref} = \beta - \frac{L_r}{V}\gamma - \alpha_{r,ref}$$

where $\beta$ represents the mass center side slip angle of the vehicle, wherein $L_r$ represents the distance from the rear axle to the vehicle mass center, wherein V represents the longitudinal speed of the vehicle, wherein $\gamma$ represents the yaw velocity of the vehicle, and wherein $\alpha_{r,ref}$ represents the desired rear wheel side slip angle obtained by using the look-up table method.

Compared with the prior art, the present invention has the following advantages:

1) According to the present invention, the original optimization problem is converted based on the extremum principle, namely, converting the conventional direct-solving method for the optimal optimization variable into indirectly obtaining the optimal control variable through the costate variable; meanwhile, a search method for the optimal costate variable initial value is designed based on the particle swarm optimization (PSO) principle; compared with the conventional direct-solving method, the strong capability of searching for a globally optimal solution further enhances the control performance while significantly improving the solving speed;

2) Under extreme working conditions, the nonlinear properties of a vehicle are prominent; therefore, to improve the control performance of the vehicle while protecting the control effect from being affected by the error accumulated in modeling as much as possible, the lateral force of the wheel is directly optimized, and a high-precision MAP chart of the wheel lateral force is established for searching the active rear wheel steering angle corresponding to the desired wheel lateral force; through adopting the method of the present invention, the accumulation of error in modeling is effectively reduced during the prediction process and the control effect is greatly improved;

1) Compared with a conventional vehicle, the coupling relationship among a plurality of control variables and states of a vehicle having independent four-wheel driving and steering is more complex; to coordinate with a plurality of control variables while avoiding conflict among the control variables, the present invention establishes an objective function for tracking the yaw velocity, inhibiting a side slip angle, and adjusting two control variables including the active rear wheel steering angle and the additional yaw moment in a coordinated manner; meanwhile, the constraint is adjusted in real time according to the driving state of the vehicle, so that the conflict among the plurality of control variables is effectively avoided and the plurality of control variables are capable of being adjusted in a coordinated manner.

DETAILED DESCRIPTION

Detailed embodiments and drawings are combined hereinafter to further elaborate the technical solution of the present invention. These embodiments are implemented based on the technical solution of the present invention. Though a detailed implementation manner and a specific operation process are described, the scope of the present invention is not limited to the following embodiments.

Figure 1:
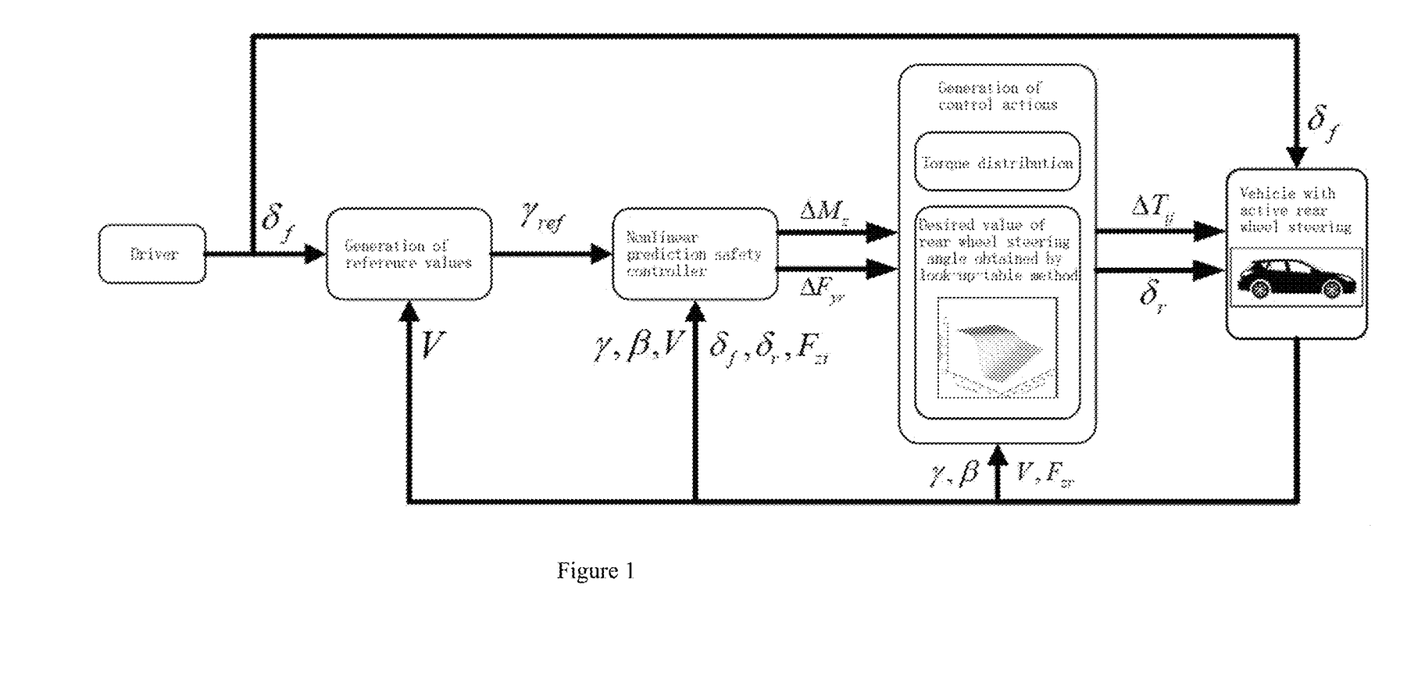
FIG. 1 is a flow block diagram illustrating the coordinated control method of the present invention.
Figure 2:
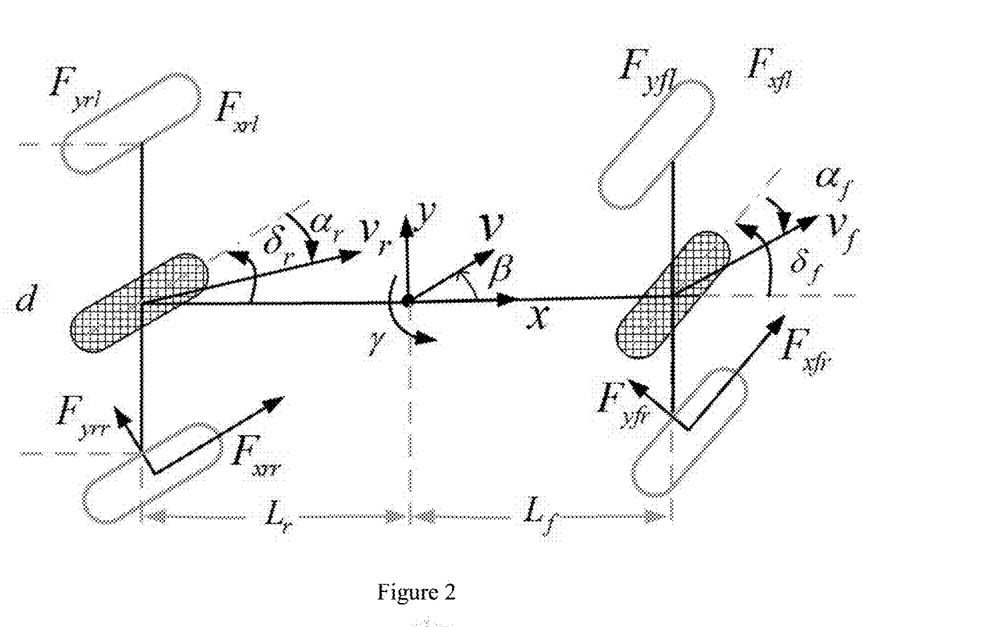
FIG. 2 is a schematic diagram illustrating the vehicle model.

FIG. 1 is a flow block diagram illustrating the coordinated control method of the present invention. As shown in FIG. 1, a driver performs a certain steering angle control according to the current vehicle state. In a reference value generation module, the desired yaw velocity is calculated according to the steering angle control performed by the driver and the current vehicle speed. Meanwhile, the desired value is restricted according to the current road adhesion condition such that a maximum friction force condition is met, and then the desired value of the final yaw velocity is sent to a prediction controller. In the prediction controller, an original optimization equation is constructed according to the current vehicle motion state and a desired value of yaw velocity calculated by the reference value generation module, then the optimization equation is solved to obtain two desired control variables, and then the desired control variables are sent to a control action generation module. In the control action generation module, the additional torque of each wheel is first calculated according to the desired additional yaw moment, then a desired active rear wheel angle is obtained by means of the look-up-table method according to the desired lateral force, and then the additional torque and the active rear wheel angle of each wheel are sent to a vehicle executor.

In this embodiment, the coordinated control method for electric vehicles having independent four-wheel driving and steering and a simulation test on the coordinated control method, comprising the steps of:
1. Prediction control:
   2) Establishing a vehicle dynamic model taking into account a plurality of control variables;
   3) Establishing a wheel force map according to the wheel model in CarSim, wherein the wheel force map is used for searching for a desired rear wheel active steering angle;
   4) Establishing a reference model of the desired yaw velocity according to the linear two-degree-of-freedom model;
   5) Establishing an objective function for tracking the yaw velocity, inhibiting a side slip angle, and adjusting two control variables including the active rear wheel steering angle and the additional yaw moment in a coordinated manner;
   6) Establishing an objective function constraint according to the vehicle safety constraint, the actuator constraint and the real-time driving state.
2. Design of fast real-time solving method for nonlinear optimization problem
   1) Introducing a relaxation factor, and converting an optimization problem under an original state constraint into an unconstrained optimization problem;
   2) Constructing a corresponding Hamiltonian function according to the objective function and the system state-space equation;
   3) Deriving an explicit optimal control variable expression according to a binary function minimum value principle, and then deriving an iterative relationship and a terminal condition of the Hamiltonian equation according to an extremum principle;
   4) Designing an optimal initial value search algorithm of the costate variable according to the PSO optimization algorithm principle;
3. Modeling and construction of simulated working conditions for electric vehicles having independent four-wheel driving and steering under extreme working conditions: selecting a corresponding vehicle model by using the CarSim software, then replacing the rear axle system of the vehicle with an active steering rear axle system, and finally, configuring simulated working conditions on the basis of the model for simulating the motion state of the vehicle under extreme working conditions, thereby verifying the validity and rapidity of the designed algorithm;

More specifically, the implementation and simulation comprising the steps of:

The controlled object of the present invention is a rear-wheel-active-steering vehicle traveling on a low-adhesion road, and therefore, the control target is to calculate the required rear wheel steering angle and the additional yaw moment according to the current state information of the vehicle and the current reference value, thereby improving the stability of the vehicle; the main design process is described as follows: first, performing a modeling on the yaw motion and lateral motion of a rear-wheel-active-steering vehicle, and establishing a proper mathematical model;

1) Vehicle Two-Degree-of-Freedom Self-Driving Model

In the present invention, the lateral motion and yaw motion of the vehicle instead of the longitudinal motion of the vehicle are primarily taken into account; therefore, the lateral motion and yaw motion of the vehicle are described by using a vehicle two-degree-of-freedom self-driving model that has been extensively applied; in this model, first, it is assumed that the longitudinal speed of the vehicle remains unchanged in a short-time-period region, and then the model may be expressed as the following equation:

$$\dot{\beta} = \frac{F_{yf} + F_{yr}}{mV} - \gamma \quad (2)$$

$$\dot{\gamma} = \frac{L_f F_{yf} - L_r F_{yr} + \Delta M_z}{I_z}$$

wherein $\dot{\beta}$ and $\dot{\gamma}$ respectively represent the derivative of the mass center side slip angle of the vehicle and the derivative of the yaw velocity of the vehicle, wherein V represents the longitudinal speed of the vehicle, wherein $F_{yf}$ and $F_{yr}$ respectively represent the wheel lateral force of the front and rear wheels, wherein $L_f$ and $L_r$ respectively represent the distances from the front and rear axles to the mass center of the vehicle, wherein m represents the mass of the vehicle, wherein $I_z$ represents the moment of inertia of the vehicle rotating around the mass center, wherein $\Delta M_z$ represents an additional yaw moment, wherein in the present invention, the lateral force of the rear wheel is divided into two portions, namely, $F_{yr}=\tilde{F}_{yr}+\Delta F_{yr}$, wherein $\tilde{F}_{yr}$ is defined as a standard lateral force, which is generated by the side slip angle of the wheel, wherein $\Delta F_{yr}$ is defined as an additional portion, which is a lateral force generated by the active rear wheel steering angle $\delta_r$, wherein the control input of the system is defined as the additional yaw moment $\Delta M_z$ generated by the wheel longitudinal force and the additional rear wheel lateral force v generated by the active rear wheel;

2) Nonlinear Wheel Model

Under extreme working conditions, the nonlinear properties of the vehicle are prominent, and therefore, the nonlinear properties of the vehicle must be considered in the model; in this embodiment, a nonlinear Fiala wheel model is used to describe the vehicle wheel properties under extreme working conditions;

Because the amplitude of the side slip angle $\alpha$ of the vehicle wheel is small, it is assumed that $\tan(\alpha) \approx \alpha$, and under this assumption, the original wheel model may be expressed as the following equation:

$$F_y = \begin{cases} -C_\alpha \alpha + \dfrac{C_\alpha^2}{3\mu F_z}|\alpha|\alpha - \dfrac{1}{3}\dfrac{C_\alpha^3}{(3\mu F_z)^2}\alpha^3, & |\alpha| \le \arctan\left(\dfrac{3\mu F_z}{C_\alpha}\right) \\ -\mu F_z \operatorname{sgn}\alpha, & \text{otherwise} \end{cases} \quad (3)$$

wherein $\mu$ represents the road adhesion coefficient, wherein $F_z$ represents a vertical load, wherein $C_\alpha$ represents the wheel cornering stiffness, wherein in this equation, the wheel side slip angle $\alpha$ is divided into a front wheel side slip angle $\alpha_f$ and a rear wheel side slip angle $\alpha_r$, which are capable of being respectively calculated by using the following equation:

$$\alpha_f = \beta + \frac{L_f}{V}\gamma - \delta_f \quad (4)$$

$$\alpha_r = \beta - \frac{L_r}{V}\gamma - \delta_r$$

wherein $\delta_f$ and $\delta_r$ respectively represent the front wheel steering angle and the rear wheel steering angle of the vehicle, and wherein $\beta$ and $\gamma$ respectively represent the mass center side slip angle and the yaw velocity of the vehicle;

3) Establishment of Vehicle Reference Model

Under extreme working conditions, taking into account the nonlinear properties of the system, a second-order reference model is used to generate a desired yaw velocity, wherein a transfer function from the front wheel steering angle $\delta_f$ to the desired yaw velocity $\gamma_{ref}$ may be expressed as the following equation:

$$\frac{\gamma_{ref}}{\delta_f} = K_\gamma \frac{1+\tau_\gamma s}{\dfrac{1}{\omega_n^2}s^2 + \dfrac{2\zeta}{\omega_n}s + 1} \quad (5)$$

wherein $\omega_n$, $\zeta$, $K_\gamma$ and $\tau_\gamma$ respectively represent the natural oscillation frequency, the damping coefficient, the yaw velocity gain, and the differential coefficient of yaw velocity, which may be calculated by using the following equation:

$$\omega_n = \frac{2}{V}\sqrt{\frac{C_f C_r (L - KV^2)}{mI_z}} \quad (6)$$

$$\zeta = \frac{m(C_f L_f^2 + C_r L_r^2) + (C_f + C_r)I_z}{2\sqrt{LmI_z C_f C_r(L - KV^2)}}$$

$$K_\gamma = \frac{V}{L + KV^2}$$

$$\tau_\gamma = \frac{mVL_f}{2C_r L}$$

wherein in the aforesaid equation, $K=-m(C_f L_f - C_r L_r)/2C_f C_r L$ is defined as a understeering gradient, and $L=L_f+L_r$ is defined as the front-rear wheelbase of the vehicle;

Based on the aforesaid reference model, the desired yaw velocity of the vehicle is obtained according to the front wheel steering angle given by a driver; however, because the adhesion force of the vehicle wheel is limited under extreme working conditions, the stability of the vehicle becomes poor when the yaw velocity grows excessively high; taking into account the aforesaid, the amplitude of the desired yaw velocity generated by the reference model should be limited according to the adhesion condition of road; the upper limit value of the yaw velocity is defined as $$\gamma_{up} = \left|\frac{\mu g}{V}\right|,$$

and the constraint that the real value of the yaw velocity should satisfy is $|\gamma_{ref}| \le \gamma_{up}$; the main design purpose of the control method in the present invention is to track the value of the desired yaw velocity of the vehicle while restraining the mass center side slip angle $\beta$ of the vehicle to the most extent, so that the desired value of the mass center side slip angle is defined as $\beta_{ref}=0$; in addition, the stability and maneuverability of a vehicle may be severely affected due to an excessively large mass center side slip angle under extreme working conditions, and therefore, for taking into account the safety, the mass center side slip angle should also be limited within a secure scope, wherein the upper limit value of the mass center side slip angle is defined as:

$$\beta_{up} = \left|\mu g\left(\frac{L_r}{V^2} + \frac{mL_f}{C_r L}\right)\right| \quad (7)$$

Resembling the yaw velocity of the vehicle, the constraint that the mass center side slip angle should satisfy is $|\beta| \le \beta_{up}$;

4) Design of Control Optimization Problem

In the design of the control optimization problem, because there are a plurality of parameters that need to be adjusted and calibrated, to simplify the calibration process, the state vector of the system is defined as $x=[x_1, x_2]^T=[\beta/\beta_{up}, \gamma/\gamma_{up}]^T$, and accordingly, the control input of the system may also be defined as a normalized form $u=[u_1, u_2]^T=[\Delta F_{yr}, \Delta M_z/\Delta M_{max}]^T$, wherein $\Delta M_{max}$ represents the maximum value of the additional yaw moment; subsequently, combined with the discretized system equation, a vehicle model designed for the prediction controller is obtained as follows:

$$x_1(k+1) = T_s \frac{F_{yf}(k) + \tilde{F}_{yr}(k) + u_1(k)}{mV\beta_{up}} + x_1(k) - T_s \frac{\gamma_{up}}{\beta_{up}} x_2(k) \quad (8)$$

$$x_2(k+1) = T_s \frac{L_f F_{yf}(k) - L_r[\tilde{F}_{yr}(k) + u_1(k)]}{\gamma_{up} I_z} + x_2(k) + \frac{\Delta M_{max} T_s}{\gamma_{up} I_z} u_2(k)$$

wherein $T_s$ represents the discrete duration of the system, wherein to improve the accuracy of the model under extreme working conditions, the lateral force of the front wheel $F_{yf}$ and the standard portion of the lateral force of the rear wheel $\tilde{F}_{yr}$ are calculated by using the nonlinear wheel model in equation (2);

The main purpose of the present invention is to improve the driving safety of the vehicle under extreme working conditions, and on this basis, the driving stability of the vehicle is also taken into account, so that the mass center side slip angle of the vehicle needs to be limited and constrained; based on the aforesaid, the subitems of the objective function for tracking the yaw velocity and the mass center side slip angle at each moment $k+1 \leq k_i \leq k+N+1$ are defined as follows:

$$L_1(k_i) = (x_2(k_i) - \gamma_{ref}/\gamma_{up})^2 \quad (9)$$

$$L_2(k_i) = (x_1(k_i) - \beta_{ref}/\beta_{up})^2$$

wherein N represents the size of the prediction time domain, and the desired value of the mass center side slip angle is defined as $\beta_{ref}=0$, wherein when the vehicle has a larger mass center side slip angle exceeding the upper limit value of the vehicle, the stability of the vehicle becomes poor, and therefore, the mass center side slip angle of the vehicle must be constrained within a safe range to ensure the driving safety of the vehicle, wherein based on the aforesaid, a mandatory state constraint $|x_1(k_i)| \leq 1$ needs to be added, and the interaction between the control actions throughout the process should also be taken into account, wherein on the premise of ensuring the performance of tracking the yaw velocity, the energy consumption in the control process should be reduced as much as possible, wherein to avoid the saturation of the wheel lateral force, the additional lateral force of the rear wheel should also be reduced as much as possible, wherein taking into account the aforesaid two, the subitems of the objective function relevant to the control variables are defined as the follows:

$$L_3(k_i) = u_1(k_i - 1)^2 \quad (10)$$

$$L_4(k_i) = u_2(k_i - 1)^2$$

wherein taking into account the limited execution capability of the executor, the amplitude of the control input should also be limited within the physical limits of the executor, wherein the additional yaw moment of the vehicle is mainly limited by the longitudinal force of the wheel and the torque of the motor, and therefore, the constraint that the additional yaw moment should satisfy is $|\Delta M_z| \leq \Delta M_{max}$, wherein for the lateral force of the rear wheel, the total lateral force of the wheel must meet the requirement of physical friction limit, and therefore, the constraint on the lateral force of the additional rear wheel is defined as the follows:

$$\Delta F_{yr,min} \leq u_1(k_i) \leq \Delta F_{yr,max} \quad (11)$$

$$\tilde{F}_{yr}(k_i) + \Delta F_{yr,min} \geq F_{yr,min}$$

$$\tilde{F}_{yr}(k_i) + \Delta F_{yr,max} \leq F_{yr,max}$$

wherein through the constraint definition of the control variable $u_1$, it can be seen that, the upper limit and the lower limit of the control variable vary dynamically along with the current motion state of the vehicle, wherein the objective function and the constraint definition are combined to establish the optimization problem of the prediction coordination control strategy as follows:

$$\min J = \sum_{k_i=k+1}^{k+N+1} [\Gamma_\gamma L_1(k_i) + \Gamma_\beta L_2(k_i) + \Gamma_{u1} L_3(k_i) + \Gamma_{u2} L_4(k_i)] \quad (12)$$

$$\text{s.t.} \ -1 \leq x_1(k_i) \leq 1$$

$$\Delta F_{yr,min} \leq u_1(k_i) \leq \Delta F_{yr,max}$$

$$-1 \leq u_2(k_i) \leq 1$$

wherein $\Gamma_\gamma$ and $\delta_\beta$ in the optimization problem respectively represent the weight coefficient of the yaw velocity tracking item and the weight coefficient of the mass center side slip angle tracking item, wherein $\Gamma_{u1}$ and $\Gamma_{u2}$ respectively represent the weight coefficients of the control variables $u_1$ and $u_2$, wherein after the optimization problem is constructed, the optimal control input is obtained by solving the optimization problem;

5) Generation of Control Actions

Figure 3:
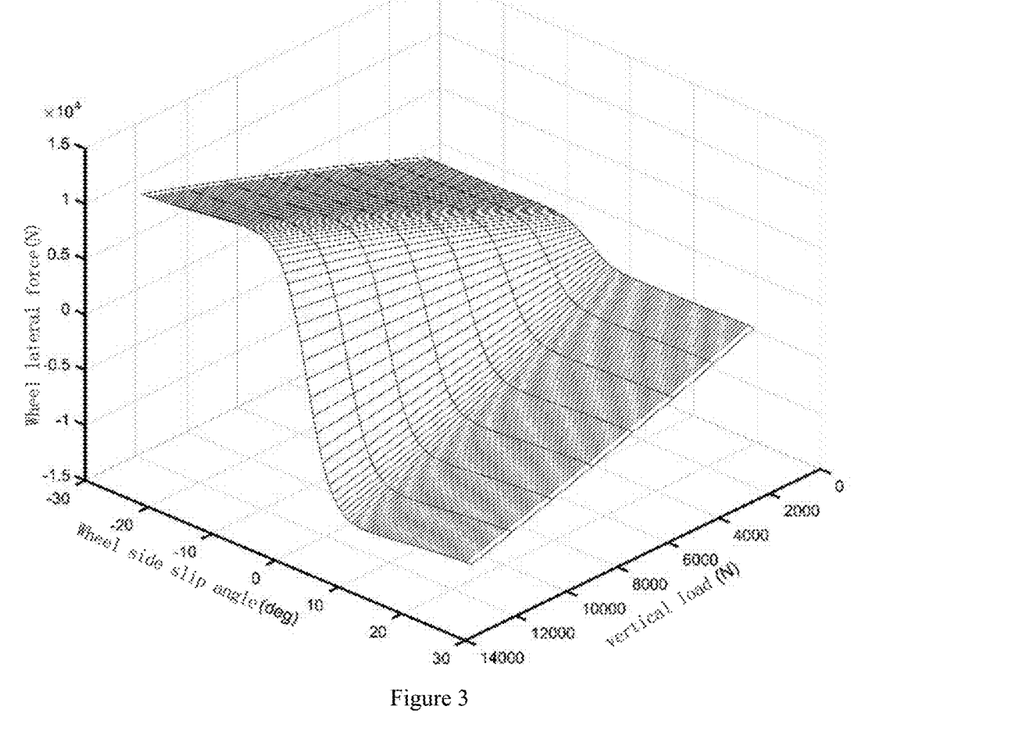
FIG. 3 is a MAP chart illustrating the high-precision wheel lateral force.

In the present invention, there are two executors configured to generate control actions while performing the control input, wherein a hub motor is used to generate an additional yaw moment, and the active rear wheel steering angle is used to generate an additional rear wheel lateral force, wherein in the distribution of torque, an additional yaw moment is generated in an average distribution manner, wherein according to the optimal control input $u^*_2(k)$ obtained by solving the optimization problem, the torque allocated to each motor is obtained as follows:

$$\Delta T_{cfl}(k) = \Delta T_{crl}(k) = -\frac{u_2^*(k) \Delta M_{max}}{d} R_e \quad (13)$$

$$\Delta T_{cfr}(k) = \Delta T_{crr}(k) = \frac{u_2^*(k) \Delta M_{max}}{d} R_e$$

wherein $\Delta_{cfl}$, $\Delta_{crl}$ respectively represent the additional torques of the left front wheel and the rear wheel, wherein $\Delta_{cfr}$, $\Delta_{crr}$ respectively represent the additional torques of the right front wheel and the rear wheel, wherein $R_e$ represents the effective rolling radius of the wheel, and wherein d represents the width of the vehicle body;

In the prediction coordination control method designed in the present invention, the second control variable is the additional lateral force of the rear wheel, and therefore, it needs to be converted into the active rear wheel steering angle of the vehicle; in the present invention, a high-precision wheel lateral force MAP chart is constructed first; the lateral force of the wheel is not only relevant to the steering angle of the vehicle, but also relevant to the state of the vehicle, such as the yaw velocity and the mass center side slip angle, etc.; to simplify the modeling process while reducing the errors of the model, the side slip angle of the wheel is selected as an intermediate variable in the present invention for obtaining the corresponding active rear wheel steering angle;

As shown in FIG. 3, the three axes in the MAP chart respectively represent a wheel lateral force, a wheel side slip angle and a vertical load, wherein the wheel model selected in this embodiment is 255-15 R17; once the vertical load of the wheel and the desired wheel lateral force are determined, a corresponding wheel side slip angle may be obtained by using a look-up-table method; in the present invention, the desired wheel lateral force is first defined as the sum of the standard portion and the additional portion, namely, $F_{yr,ref}=\tilde{F}_{yr}+\Delta F_{yr}$, and then the vertical load of the wheel is combined to obtain the desired active rear wheel steering angle as follows:

$$\delta_{r,ref} = \beta - \frac{L_r}{V}\gamma - \alpha_{r,ref} \quad (14)$$

wherein $\beta$ represents a mass center side slip angle of the vehicle, wherein $L_R$ represents a distance from the rear axle to the mass center of the vehicle, wherein V represents a longitudinal velocity of the vehicle, wherein $\gamma$ represents a yaw velocity of the vehicle, and wherein $\alpha_{r,ref}$ represents a desired rear wheel side slip angle obtained by using the look-up-table method;

6) Fast Solving Algorithm Based on the Extreme Value Principle

Figure 4:
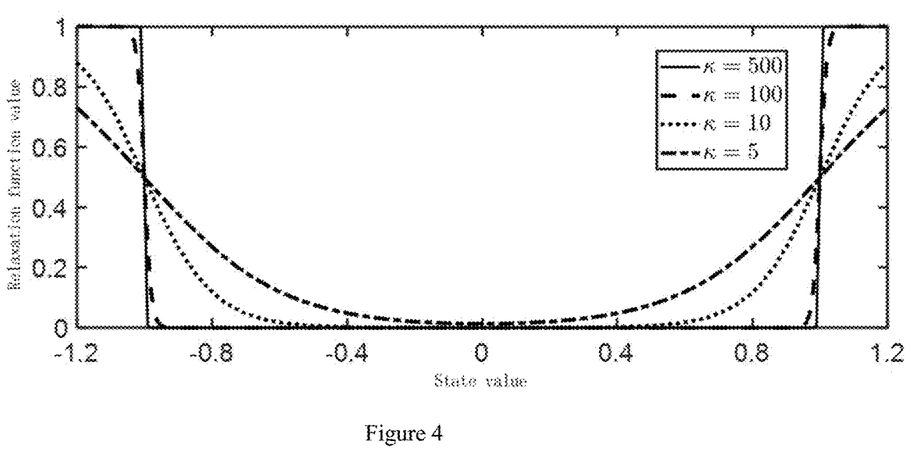
FIG. 4 is a schematic diagram illustrating a relaxation function value varying along with the variation of state.

It can be seen from the above process that the optimal control input can be obtained by solving a nonlinear planning problem; normally, the nonlinear planning problem may be solved by using some common direct iteration methods, such as the SQP and IPOPT methods; however, these methods fail to meet the requirement of in-vehicle environments due to the huge amount of calculation; to solve this problem, the present invention designs an indirect iteration method based on an extremum principle to improve the real-time performance of an algorithm;

In driving, to ensure the safety of a vehicle, the mass center side slip angle needs to be constrained; however, because the extreme value principle cannot be used to directly process the state constraint of the system, the state constraint needs to be properly converted, and a relaxation function is introduced as follows:

$$\zeta(k_i) = v\left(1 + e^{\kappa(1+x_1(k_i))}\right)^{-1} + v\left(1 + e^{\kappa(1-x_1(k_i))}\right)^{-1} \quad (15)$$

wherein $\kappa$ represents the sensitivity of the relaxation function, wherein v represents the convergence value of the relaxation function, which is a higher value for ensuring that the state is constrained within the boundary, wherein as shown in FIG. 4, when the system state is away from its constraint boundary, the value of the relaxation function may be ignored, and when the system state approaches the constraint boundary, the value of the relaxation function increases sharply, wherein after the relaxation function is introduced, the redefined subitem of the objective function is obtained as follows:

$$L_2'(k_i) = L_2(k_i) + \zeta(k_i) \quad (16)$$

wherein after the conversion, the optimization problem under the original constraint may be converted into a new unconstrained optimization problem, which may be expressed as the following equation:

$$\min J = \sum_{k_i=k+1}^{k+N+1} [\Gamma_\gamma L_1(k_i) + \Gamma_\beta L_2'(k_i) + \Gamma_{u1} L_3(k_i) + \Gamma_{u2} L_4(k_i)] \quad (17)$$

$$s.t. \ \Delta F_{yr,min} \leq u_1(k_i) \leq \Delta F_{yr,max}$$

$$-1 \leq u_2(k_i) \leq 1$$

wherein based on the aforesaid process, in combination with the system equation in equation (1), the Hamiltonian function at a moment $k+1 \leq k_i \leq k+N+1$ may be obtained as:

$$H(x(k_i), u(k_i)) = L_1(k_i) + \Gamma_\beta L_2'(k_i) + \Gamma_{u1} L_3(k_i) + \Gamma_{u2} L_4(k_i) \quad (18)$$

$$+ \lambda_1(k_i)\left(F_1(x(k_i), u_1(k_i)) - \frac{\gamma_{up}}{\beta_{up}}x_2(k_i)\right)$$

$$+ \lambda_2(k_i)\left(F_2(x(k_i), u_2(k_i)) + \frac{\Delta M_{max}}{\gamma_{up} I_z}u_2(k_i)\right)$$

wherein subitems $F_1(x(k_i))$ and $F_2(x(k_i))$ are respectively defined as:

$$F_1(x(k_i)) = \frac{F_{yf}(x(k_i), \delta_f(k)) + F_{yr}(x(k_i), \delta_r(k), u_1(k_i))}{\beta_{up} mV} \quad (19)$$

$$F_2(x(k_i)) = \frac{L_f F_{yf}(x(k_i), \delta_f(k)) - L_r F_{yr}(x(k_i), \delta_r(k), u_1(k_i))}{\gamma_{up} I_z}$$

wherein $\lambda(k_i)=[\lambda_1(k_i), \lambda_2(k_i)]^T$ in equation (17) represents a Lagrange multiplier at a moment $k_i$, wherein according to a regular equation $\dot{\lambda}=-\partial H/\partial x$, the optimal necessary condition is obtained as:

$$\lambda(k_i) = \lambda(k_i + 1) + \frac{\partial H}{\partial x}\bigg|_{k_i+1} T_s \quad (20)$$

wherein according to the definition in equation (16), it can be seen that the optimization problem may be divided into the optimal control problem of the terminal time and the optimal control problem of the free terminal state, so that the terminal condition may be obtained as follows:

$$\lambda(k+N+1) = 0 \quad (21)$$

wherein if the optimal control input $u^*(k_i)$ exists, the Hamiltonian function must be enabled at each moment to obtain the minimum value, namely, under the effect of the optimal control input u*(k$_i$), the Hamiltonian function must satisfy the following:

$$H(u^*(k_i), \lambda_1^*(k_i), \lambda_2^*(k_i)) \le H(u(k_i), \lambda_1^*(k_i), \lambda_2^*(k_i)) \quad (22)$$

wherein to find the optimal control input according to the known Lagrange multiplier λ(k$_i$) and the initial state of the system x(k$_i$), the Hamiltonian function is now re-written as follows:

$$H(x(k_i), u(k_i)) = \quad (23)$$
$$p_1 u_1(k_i)^2 + p_2(k_i) u_1(k_i) + q_1 u_2(k_i)^2 + q_2(k_i) u_2(k_i) + g(x(k_i))$$

wherein the coefficients are respectively defined as:

$$p_1 = \Gamma_{u1}, q_1 = \Gamma_{u2}, p_2 = \frac{\lambda_1}{\beta_{up} mV} - \frac{\lambda_2 L_r}{\gamma_{up} I_z}, q_2 = \frac{\lambda_2 \Delta M_{max}}{\gamma_{up} I_z} \quad (24)$$

wherein the constant value residual equation may be expressed as:

$$g(x(k_i)) = \Gamma_\gamma (x_2(k_i) - \gamma_{ref}/\gamma_{up})^2 + \Gamma_\beta ((x_1(k_i) - \beta_{ref}/\beta_{up})^2 + \zeta(k_i)) \quad (25)$$
$$+ \lambda_1(k_i) \left( \frac{F_{yf}(x(k_i), \delta_f(k)) + \tilde{F}_{yr}(x(k_i), \delta_r(k))}{\beta_{up} mV} - \frac{\gamma_{up}}{\beta_{up}} x_2(k_i) \right)$$
$$+ \lambda_2(k_i) \frac{L_f F_{yf}(x(k_i), \delta_f(k)) - L_r \tilde{F}_{yr}(x(k_i), \delta_r(k))}{\gamma_{up} I_z}$$

wherein through the definition of the Hamiltonian function, it can be seen that the function may be regarded as a binary quadratic function which takes u$_1$ and u$_2$ as independent variables, and at this point, the problem in equation (21) may be equivalent to finding the minimum value of the quadratic function:
wherein to obtain the minimum value of the binary quadratic function, the coefficient is defined as follows:

$$A = \frac{\partial^2 H}{\partial u_1^2} = 2\Gamma_{u1}, B = \frac{\partial^2 H}{\partial u_1 \partial u_2} = 0, C = \frac{\partial^2 H}{\partial u_2^2} = 2\Gamma_{u2} \quad (26)$$

wherein in the optimization problem, all weight coefficients are greater than zero, wherein according to the binary function extremum theorem, it can be seen that, when $B^2 - 4AC = -16\Gamma_{u1}\Gamma_{u2} < 0$ and A>0, the binary function obtains a minimum value at the arrest point of the binary function, wherein therefore, it is proved that the Hamiltonian function obtains a minimum value at its arrest point $$\frac{\partial H}{\partial u_1} = 0, \frac{\partial H}{\partial u_2} = 0,$$

and wherein in addition, taking into account the constraints of the vehicle executor, the explicit optimal control input at each moment may be expressed as:

$$u_1(k_i) = \begin{cases} \Delta F_{yr,min}, & \text{if } -\frac{p_2(k_i)}{2p_1} \le \Delta F_{yr,min} \\ -\frac{p_2(k_i)}{2p_1}, & \text{if } \Delta F_{yr,min} < -\frac{p_2(k_i)}{2p_1} < \Delta F_{yr,max} \\ \Delta F_{yr,max}, & \text{if } -\frac{p_2(k_i)}{2p_1} \ge \Delta F_{yr,min} \end{cases} \quad (27)$$

$$u_2(k_i) = \begin{cases} -1, & \text{if } -\frac{q_2(k_i)}{2q_1} \le -1 \\ -\frac{q_2(k_i)}{2q_1}, & \text{if } -1 < -\frac{q_2(k_i)}{2q_1} < 1 \\ 1, & \text{if } -\frac{q_2(k_i)}{2q_1} \ge 1 \end{cases}.$$

7) Optimal Lagrange Multiplier Search Algorithm Based on Particle Swarm Optimization It can be seen from the above analysis that, the optimal control input solving problem at each moment is capable of being converted into an extremum solving problem of a polynomial function under known initial conditions λ(k$_i$) and x(k$_i$), then, if the optimal Lagrange multiplier initial value λ*(k) is found, the optimal Lagrange multiplier initial value is made to meet the terminal condition:

$$\lambda^*(k) = \arg \min_{\lambda(k) \in \square^2} \|\lambda(k+N+1)\|, \quad (28)$$

and then, the optimal control input sequence (u*(k), ..., u*(k+N)) is obtained by means of explicit iteration; to find the optimal Lagrange multiplier initial value satisfying the above conditions, in the present invention, a search algorithm based on particle swarm optimization is adopted, wherein the algorithm parameters include the number of particles n=10, the maximum number of iterations I$_{max}$=20, the minimum number of iterations I$_{min}$=5, an inertial factor C$_i$=0.5 an individual learning factor C$_s$=2, a group learning factor C$_g$=2, and a tolerance ε=0.5, wherein the search process may be expressed as:

(1) Initialization of Particle Swarm

First, a position of an initial point is given, and if it is a first operation of a control algorithm, the given position of the initial point is (0,0); if not, the optimal value of the last iteration is inherited as an initial point; subsequently, 10 initial particles are generated near the initial point, and the particle positions P$_i$(i 1, ..., n) are uniformly distributed within the range of the initial point [−0.5,0.5]; for the speed of the initial point, the speed of the particles V$_i$(i 1, ..., n) is made to uniformly distributed within a range of [−5,5]; subsequently, following the iteration calculation process shown in FIG. 5: according to the analytical solution of the optimal control input obtained by means of equations (23)-(26) at the moment k$_i$ and the iteration relationship shown in equations (7), (17) and (19), performing a convergence value calculation of the particles in the initial swarm, finding out the best point P$_{b,g}$ and the worst point P$_{w,g}$ in all particles after the calculation is completed, and respectively recording corresponding convergence values, wherein in the initialization process, the historical best point of each particle P$_{b,i}$(i=1 ..., n) is set as the current initial point, and meanwhile, the number of current iterations is defined as I$_c$=0;

(2) Update of Particle Swarm

Updating the speed and the position according to the historical best point of each particle and the historical best point of the particle swarm, wherein the updating process may be expressed as:

$$V_i = C_i V_i + C_s \text{ random}(0, 1)(P_{b,i} - P_i) + C_g \text{ random}(0, 1)(P_{b,g} - P_i) \quad (29)$$

$$P_i = P_i + V_i$$

wherein random(0,1) represents a random number between (0,1).

(3) Update of Particle Swarm Convergence Value

Figure 5:
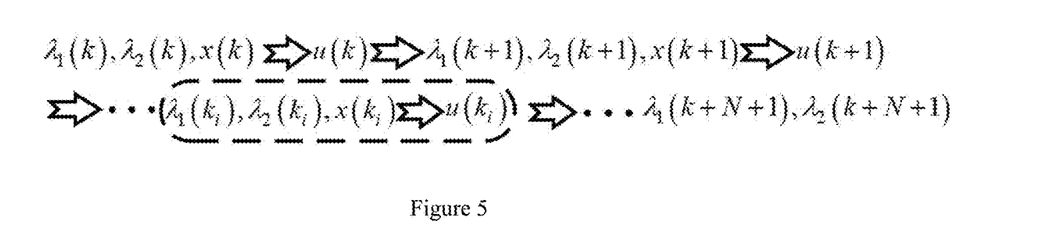
FIG. 5 is a schematic diagram illustrating the iteration relationship.

Recalculating the updated particle swarm according to the iteration process shown in FIG. 5, wherein during the calculation, if the convergence value of the i-th particle is lower than the current optimal value of the i-th particle, the position of $P_{b,i}(i=1, \ldots, n)$ is updated to the current particle position, and if not, the position of $P_{b,i}(i\ 1, \ldots, n)$ remains unchanged, wherein after the calculation of all the particle convergence values is completed, the best point $P_{b,g}$ of the particle swarm is updated to the position of the smallest particle in all the current particle convergence values, and the worst point $P_{w,g}$ of the particle swarm is updated to the position of the largest particle in all the current particle convergence values, wherein the number of current iterations is increased by one, namely, $I_c = I_c + 1$;

(4) Termination of Condition Determination

To ensure the solving effect of the algorithm while prevent the algorithm from falling into an infinite loop, two termination conditions are set as follows:

$$\lambda(P_{w,g}) > \lambda(P_{b,g}) + \varepsilon \text{ and } I_c < I_{max} \quad (30)$$

$$I_c < I_{min}$$

wherein $\lambda(P_{b,g})$ and $\lambda(P_{w,g})$ respectively represent a final convergence value obtained according to the iteration shown in FIG. 5 when the best point and the worst point are used as Lagrange multiplier initial values, wherein after step (3) is completed, two conditions are judged, and if one of the conditions is satisfied, it indicates that the search process is not completed, and then returns to step (2) to continue the iteration, wherein if none of the above two conditions is satisfied, it indicates that the search process is completed, and meanwhile, the best point $P_{b,g}$ of the current particle swarm is output as the optimal Lagrange multiplier initial value;

8) Simulation for Verification and Comparison

In this embodiment, the validity of the coordinated control method of the present invention is verified by using the MATLAB/CarSim joint simulation. The parameters of the vehicle are shown in Table 1:

TABLE 1

Parameters of the Vehicle Model

| Symbol | Description | Value | Unit |
|---|---|---|---|
| m | Whole vehicle mass | 1270 | [kg] |
| $I_z$ | Moment of inertia of the vehicle rotating around the mass center | 1536.7 | [kg · m²] |
| $L_f$ | Vehicle front half wheelbase | 1.05 | [m] |
| $L_r$ | Vehicle rear half wheelbase | 1.895 | [m] |
| $C_f$ | Front wheel cornering stiffness | 135000 | [N/rad] |
| $C_r$ | Rear wheel cornering stiffness | 85000 | [N/rad] |
| $R_e$ | Wheel rolling radius | 0.325 | [m] |
| μ | Road friction coefficient | 0.35 | / |

In the prediction control optimization, the weight parameter is respectively set as $\Gamma_\gamma = 1.55$, $\Gamma_\beta = 0.63$, $\Gamma_{u1} = 0.13$, $\Gamma_{u2} = 0.18$, in the control variable constraint, the weight parameter is set as $\Delta M_{max} = 800$ Nm, the sampling time is $T_s = 0.01$ s, and the prediction time domain is N=15.

Double-Lane Change Working Condition Experiment

In the simulation, a double-lane change working condition is adopted. The vehicle speed is 80 km/h, which is kept changed in the whole working condition.

Figure 6:
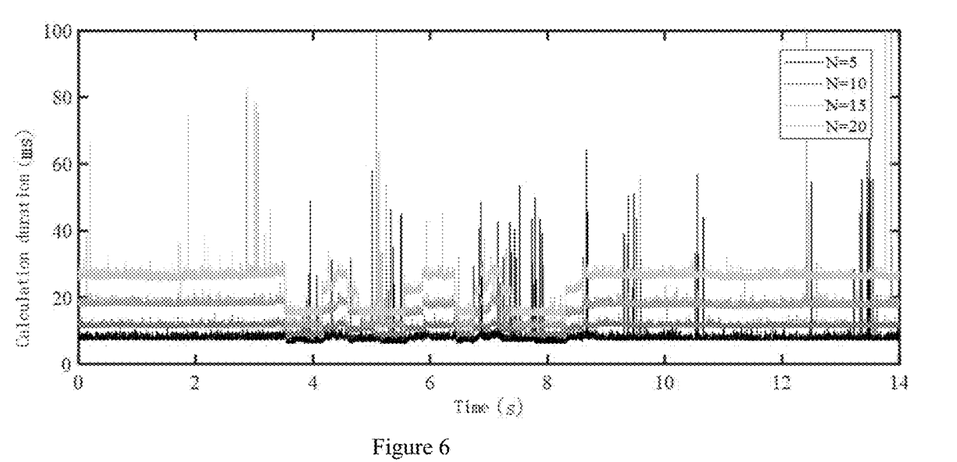
FIG. 6 is a schematic diagram illustrating the comparison of calculation duration of a direct solving algorithm based on an interior point method in different prediction time domains.
Figure 7:
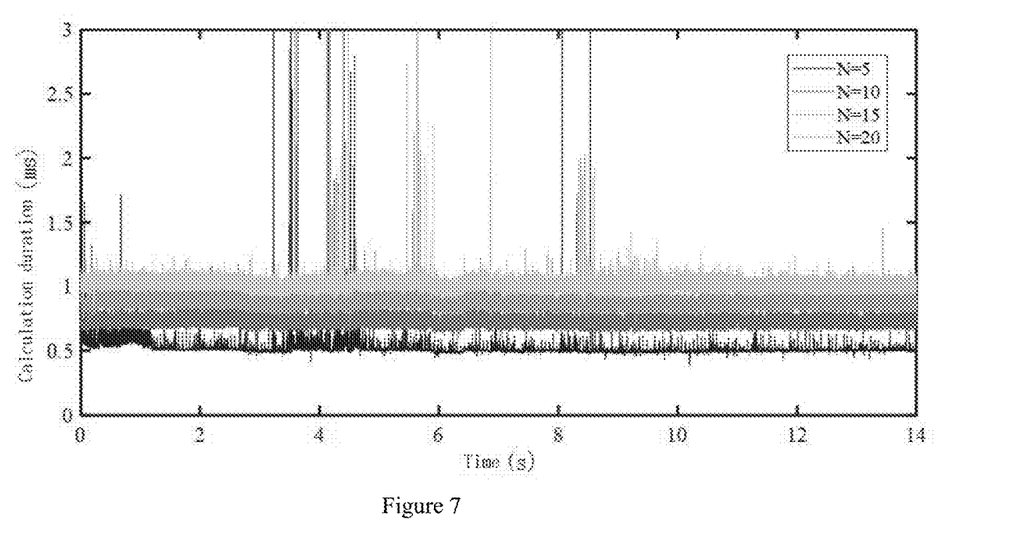
FIG. 7 is a schematic diagram illustrating the comparison of calculation duration of a fast-solving algorithm of the present invention in different prediction time domains.
Figure 8:
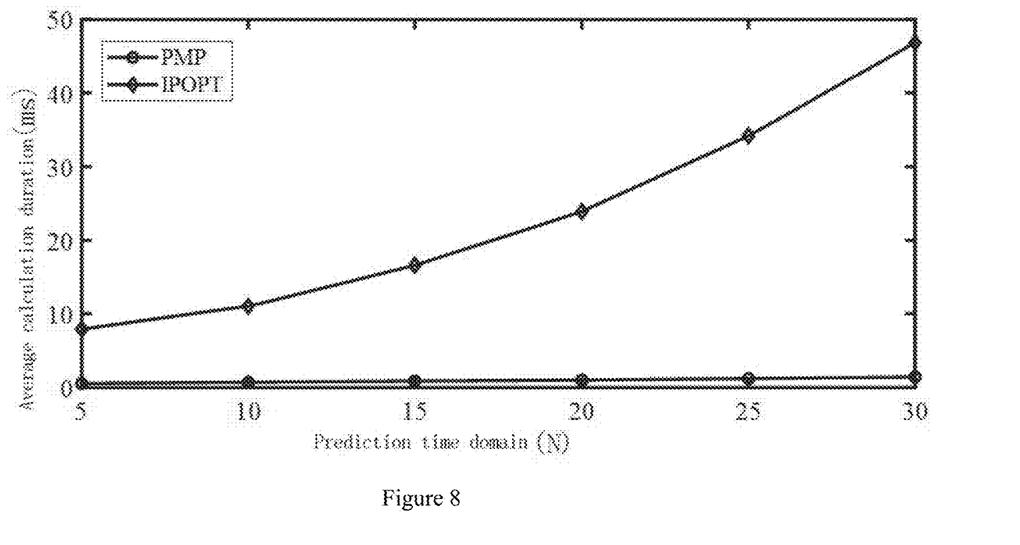
FIG. 8 is a schematic diagram illustrating the comparison of average solving duration of the two algorithms in an embodiment of the present invention in different prediction time domains.

First, the solving time of a traditional IPOPT-based direct solving algorithm and the solving time of a PMP-based fast solving algorithm of the present invention are compared. The solving time of the IPOPT algorithm and the solving time of the PMP algorithm are respectively shown in FIG. 6 and FIG. 7. It can be seen from the figures that the solving time of the IPOPT algorithm and the solving time of the PMP algorithm both increase along with the increase of the prediction time domain. However, in the same prediction time domain, the time spent by the PMP-based fast solving algorithm of the present invention is far less than that spent by the conventional IPOPT algorithm. In addition, when the optimization problem is complex, for example, during the $4^{th}$ to $11^{th}$ seconds, the solving speed of the fast real-time solving algorithm designed by the present invention is about ten times faster than that of the IPOPT algorithm. The average calculation time of the aforesaid two algorithms is shown in FIG. 8. It can be seen that, with the increase of the prediction time domain, the average solving time of the IPOPT-based solving algorithm sharply increases in an exponential level, while the PMP-based solving algorithm of the present invention increases linearly along with the increase of the prediction time domain. From the transient state and the average solving time, it can be seen that the PMP-based fast solving algorithm of the present invention achieves better real-time performance and is capable of obtaining the control variables in time in a vehicle-mounted environment while greatly improving the driving safety of the vehicle.

Figure 9:
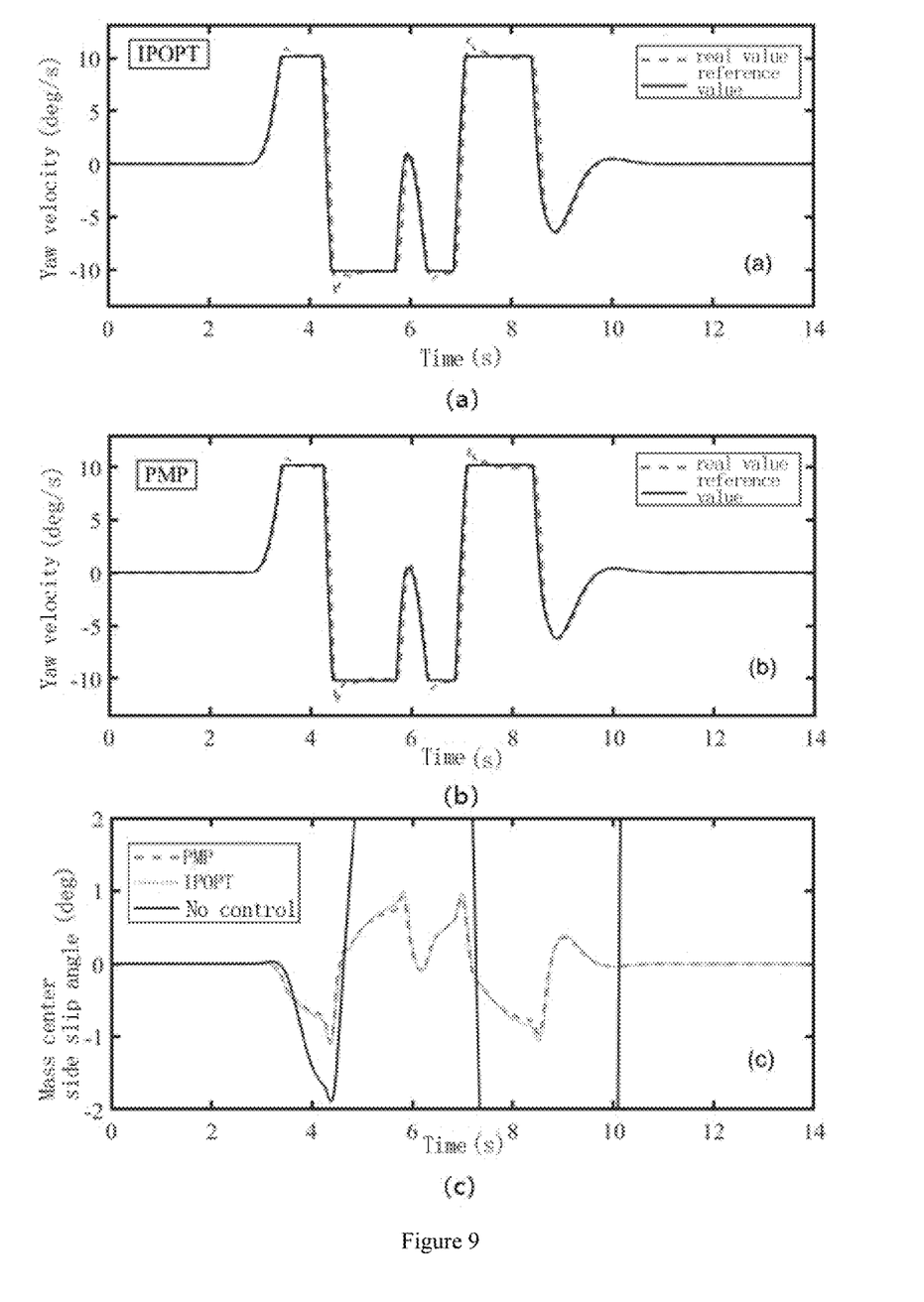
FIG. 9 is a schematic diagram illustrating a vehicle state simulation result of the two algorithms in an embodiment of the present invention when the controller is turned off, wherein FIG. 9(*a*) is a schematic diagram illustrating a vehicle state simulation result of the IPOPT algorithm, FIG. 9(*b*) is a schematic diagram illustrating a vehicle state simulation result of the PMP algorithm, and FIG. 9(*c*) is a schematic diagram illustrating a comparison of the control effect between the two algorithms when the controller is turned off.

Both the effect of tracking the yaw velocity of the vehicle and the effect of inhibiting the mass center side slip angle are shown in FIG. 9. It can be seen that the control method provided by the present invention is capable of accurately tracking the desired yaw velocity of the vehicle while greatly improving the driving safety of the vehicle under extreme working conditions. When the control method is no longer used, it can be seen that, a large mass center side slip angle appears, and under the action of the mass center side slip angle, the stability of the vehicle becomes poor, resulting in the occurrence of an accident. The control effect of the simulation experiment also proves that the fast-solving algorithm designed by the present invention rivals the conventional IPOPT in terms of solving effect, proving that the solving algorithm of the present invention achieves high validity.

In conclusion, the simulation experiment proves that, compared with a conventional solving algorithm, the fast-solving algorithm designed by the present invention is capable of significantly improving the solving speed, allowing the nonlinear prediction coordination control algorithm to be applied to a vehicle-mounted controller. In addition, the simulation also proves the validity of the prediction coordination control method for vehicles having four-wheel independent driving and steering under the extreme working conditions. The method of the present invention effectively enhances the safety of a vehicle under extreme working conditions, so that the driving safety of the vehicle is ensured.

The preferred embodiments of the present invention are described in detail above. It should be understood that modifications and variations may be made by those skilled in the art according to the concept of the present invention without paying creative labor. Therefore, the technical solutions obtained by those skilled in the art according to the concept of the present invention by means of logical analysis, reasoning or limited experiments on the basis of the prior art should fall into the scope defined by the claims of the present invention.

What is claimed is:

1. A method for coordinated control of an electric vehicle having independent four-wheel driving and steering, the method comprising:
   performing a steering angle control based on a current vehicle motion state;
   calculating a desired value of yaw velocity in a reference value generation module based on the steering angle control and a current vehicle driving speed,
   constructing an optimization problem in a prediction controller based on the current vehicle motion state and calculating the desired value of yaw velocity by the reference value generation module, wherein an objective function of the optimization problem includes tracking the yaw velocity,
   inhibiting a mass center side slip angle, adjusting an active rear wheel steering angle and an additional yaw moment control variable in a coordinated manner;
   solving the optimization problem to obtain a desired active rear wheel steering angle control variable and a desired additional yaw moment control variable;
   calculating an additional torque of each wheel in the control action generation module according to the desired additional yaw moment control variable;
   obtaining the desired active rear wheel steering angle using a look-up table method based on a desired lateral force; and
   transmitting the calculated additional torque of each wheel and the desired active rear wheel steering angle to an executor of the vehicle performing a coordinated control based on the additional torque of each wheel and the desired active rear wheel steering angle;
   wherein
   the fast solving of the original optimization problem, comprising the steps of:
   converting a to-be-optimized problem into an explicit solving problem based on the Pontryagin extremum principle,
   finding an initial value of an optimal co-state variable by means of particle swarm optimization, and
   indirectly solving the original optimization problem based on the initial value of the optimal co-state variable.

2. The method for coordinated control of an electric vehicles having independent four-wheel driving and steering of claim 1, wherein a second-order reference model is used to generate a desired yaw velocity, wherein a transfer function from the front wheel steering angle to $\delta^f$ the desired yaw velocity $\gamma_{ref}$ may be expressed as the following equation:

$$\frac{\gamma_{ref}}{\delta_f} = K_\gamma \frac{1 + \tau_\gamma s}{\frac{1}{\omega_n^2} s^2 + \frac{2\zeta}{\omega_n} s + 1}$$

wherein $\omega_n$, $\zeta$, $K_\gamma$ and $\tau_\gamma$ respectively represent the natural oscillation frequency, the damping coefficient, the yaw velocity gain, and the differential coefficient of yaw velocity, which may be calculated by using the following equation:

$$\omega_n = \frac{2}{V}\sqrt{\frac{C_f C_r (L - KV^2)}{mI_z}}$$

$$\zeta = \frac{m(C_f L_f^2 + C_r L_r^2) + (C_f + C_r)I_z}{2\sqrt{LmI_z C_f C_r (L - KV^2)}}$$

$$K_\gamma = \frac{V}{L + KV^2}$$

$$\tau_\gamma = \frac{mVL_f}{2C_r L}$$

wherein in the aforesaid equation, $K = -m\ (C_f L_f - C_r L_r)/2C_f C_r L$ is defined as a understeering gradient, and $L = L_f + L_r$ is defined as the front-rear wheelbase of the vehicle, wherein $L_f$ and $L_r$ respectively represent the distances from the front and rear axles to the mass center of the vehicle, wherein V represents the longitudinal speed of the vehicle, wherein m represents the mass of the vehicle, wherein $I_z$ represents the moment of inertia of the vehicle rotating around the mass center, wherein $C_f$ and $C_r$ respectively represent the front wheel cornering stiffness and rear wheel cornering stiffness, wherein the upper limit value of the yaw velocity is defined as $$\gamma_{up} = \left|\frac{\mu g}{V}\right|,$$

and the constraint that the real value of the yaw velocity should satisfy is $|\gamma_{ref}| \leq \gamma_{up}$.

3. The method for coordinated control of an electric vehicles having independent four-wheel driving and steering of claim 1, wherein the original optimization problem further comprising:
   an objective function for tracking the yaw velocity, inhibiting the mass center side slip angle, and adjusting the active rear wheel steering angle and the additional yaw moment control variable in a coordinated manner;
   and establishing an objective function constraint according to the vehicle safety constraint, the actuator constraint and the real-time driving state, wherein the optimization problem is expressed as follows:

$$\min J = \sum_{k_i = k+1}^{k+N+1} [\Gamma_\gamma L_1(k_i) + \Gamma_\beta L_2(k_i) + \Gamma_{u1} L_3(k_i) + \Gamma_{u2} L_4(k_i)]$$

$$\text{s.t. } -1 \leq x_1(k_i) \leq 1$$

$$\Delta F_{yr,min} \leq u_1(k_i) \leq \Delta F_{yr,max}$$

$$-1 \leq x_1(k_i) \leq 1$$

wherein in the aforesaid, $L_1(k_i)$ and $L_2(k_i)$ respectively represent subitems of the objective function of the yaw velocity and the mass center side slip angle tracking item at the moment $k_i$, wherein $L_3(k_i)$ and $L_4(k_i)$ respectively represent subitems of the objective function of the active rear wheel steering angle control variable $u_1$ and the additional yaw moment control variable $u_2$ at the moment $k_i$, wherein $\Gamma_\gamma$ and $\Gamma_\beta$ respectively represent the weight coefficient of the yaw velocity tracking item and the weight coefficient of the mass center side slip angle tracking item, wherein $\Gamma_{u1}$ and $\Gamma_{u2}$ respectively represent weight coefficients of the additional yaw moment control variable $u_1$ and the additional yaw moment control quantity $u_2$, wherein $x_1(k_i)$ represents a mass center side slip angle tracking item of the vehicle, wherein $u_1(k_i)$ and $u_2(k_i)$ respectively represent an additional yaw moment control variable and an additional yaw moment control variable, and wherein $\Delta F_{yr,min}$ and $\Delta F_{yr,max}$ respectively represent the minimum and maximum values of the additional portion of the lateral force of the rear wheel.

4. The method for coordinated control of an electric vehicles having independent four-wheel driving and steering of claim 3, wherein the subitems of the objective function for tracking the yaw velocity and the mass center side slip angle at each moment $k+1 \leq k_i \leq k+N+1$ are defined as follows:

$$L_1(k_i) = (x_2(k_i) - \gamma_{ref}/\gamma_{up})^2$$
$$L_2(k_i) = (x_1(k_i) - \beta_{ref}/\beta_{up})^2$$

wherein N represents the size of the prediction time domain, wherein $x_1(k_i)$ and $x_2(k_i)$ respectively represent a mass center side slip angle tracking item and a yaw velocity tracking item of the vehicle, wherein the yaw velocity upper limit value is defined as $$\gamma_{up} = \left|\frac{\mu g}{V}\right|,$$

wherein the desired yaw velocity satisfies the constraint $|\gamma_{ref}| \leq \gamma_{up}$, wherein the desired mass center side slip angle is defined as $\beta_{ref}=0$, the mass center side slip angle upper limit value is defined as $$\beta_{up} = \left|\mu g\left(\frac{L_r}{V^2} + \frac{mL_f}{C_r L}\right)\right|,$$

and the constraint that the mass center side slip angle meets is defined as $|\beta| \leq \beta_{up}$, wherein the subitems of the objective function of the additional yaw moment control variable $u_1$ and the additional yaw moment control variable $u_2$ are:

$$L_3(k_i) = u_1(k_i - 1)^2$$
$$L_4(k_i) = u_2(k_i - 1)^2$$

5. The method for coordinated of an electric vehicle having independent four-wheel driving and steering of claim 4, wherein obtaining the mass center side slip angle tracking item $x_1(k_i)$ and the yaw velocity tracking item $x_2(k_i)$ of the vehicle based on a discrete vehicle two-degree-of-freedom self-driving model, comprising the steps of:

defining a state vector of the system as $x=[x_1, x_2]^T=[\beta/\beta_{up}, \gamma/\gamma_{up}]^T$, wherein $\beta$ and $\gamma$ respectively represent the mass center side slip angle of the vehicle and the yaw velocity of the vehicle, and $\gamma_{up}$ and $\beta_{up}$ respectively represent the yaw velocity upper limit value and the mass center side slip angle upper limit value;

defining the control input of the system is a normalized form $u=[u_1, u_2]^T=[\Delta F_{yr}, \Delta M_z/\Delta M_{max}]^T$, wherein $\Delta F_{yr}$ represents the additional portion of the rear wheel lateral force, $\Delta M_z$ represents the additional yaw moment, and $\Delta M_{max}$ represents the maximum value of the additional yaw moment, wherein the following is obtained by the discrete vehicle two-degree-of-freedom self-driving model:

$$x_1(k+1) = T_s \frac{F_{yf}(k) + \tilde{F}_{yr}(k) + u_1(k)}{mV\beta_{up}} + x_1(k) - T_s \frac{\gamma_{up}}{\beta_{up}} x_2(k)$$

$$x_2(k+1) = T_s \frac{L_f F_{yf}(k) - L_r[\tilde{F}_{yr}(k) + u_1(k)]}{\gamma_{up} I_z} + x_2(k) + \frac{\Delta M_{max} T_s}{\gamma_{up} I_z} u_2(k)$$

wherein $T_s$ represents the discrete duration of the system, wherein and $L_f$ and $L_r$ respectively represent the distances from the front and rear axles to the mass center of the vehicle, wherein m represents the mass of the vehicle, wherein $I_z$ represents the moment of inertia of the vehicle rotating around the mass center, wherein V represents the longitudinal speed of the vehicle, wherein the lateral force of the front wheel $F_{yf}$ and the standard portion of the lateral force of the rear wheel $\tilde{F}_{yr}$ are calculated by using the nonlinear wheel model.

6. The method for coordinated control of an electric vehicle having independent four-wheel driving and steering of claim 5, wherein the nonlinear wheel model uses a nonlinear Fiala wheel model, making $\tan(\alpha) \approx \alpha$, and the nonlinear wheel model is expressed as follows:

$$F_y = \begin{cases} -C_\alpha \alpha + \frac{C_\alpha^2}{3\mu F_z}|\alpha|\alpha - \frac{1}{3}\frac{C_\alpha^3}{(3\mu F_z)^2}\alpha^3, & |\alpha| \leq \arctan\left(\frac{3\mu F_z}{C_\alpha}\right) \\ -\mu F_z \operatorname{sgn}\alpha, & \text{otherwise} \end{cases}$$

wherein $\mu$ is a road adhesion coefficient, $F_z$ is a vertical load, $C_\alpha$ is a wheel cornering stiffness, $\alpha$ is a wheel side slip angle divided into a front wheel side slip angle $\alpha_f$ and a rear wheel side slip angle $\alpha_r$, which are respectively calculated by the following:

$$\alpha_f = \beta + \frac{L_f}{V}\gamma - \delta_f$$

$$\alpha_r = \beta - \frac{L_r}{V}\gamma - \delta_r$$

where $\beta$ and $\gamma$ respectively represent the mass center side slip angle and the yaw angle velocity of the vehicle, wherein $L_f$ and $L_r$ respectively represent the distance from the front axle to the vehicle center, wherein V represents the longitudinal speed of the vehicle, and wherein $\delta_f$ and $\delta_r$ respectively represent the front wheel steering angle and the rear wheel steering angle of the vehicle.

7. The method for coordinated control of an electric vehicles having independent four-wheel driving and steering of claim 1, wherein specifically, solving the optimization problem, comprising the steps of:
- introducing a relaxation factor, and converting the state constraint, constructing a corresponding Hamiltonian function according to the objective function and the vehicle system state-space equation,
- deriving an explicit optimal control variable expression according to a binary function minimum value principle, and then deriving an iterative relationship and a terminal condition of the Hamiltonian equation according to an extremum principle, and
- finding out an initial value of an optimal costate variable, and obtaining an optimal control input sequence in an explicit iteration manner based on the optimal initial value.

8. The method for coordinated control of an electric vehicles having independent four-wheel driving and steering of claim 1, wherein finding out the initial value of the optimal costate variable by means of particle swarm optimization, comprising the steps of:
- initializing the particle swarm: giving the position of an initial point; generating a plurality of initial particles near the initial point and setting the speed of the initial point;
- according to the analytical solution of the explicit optimal control variable, performing a calculation of convergence value on the particles in the initial particle swarm by means of the iteration relationship of the Hamiltonian equation, finding out the best point and the worst point in the whole particle swarm after the calculation is completed, and respectively recording the corresponding convergence values; setting a historical best point of each particle as a current position of the initial point, and defining the number of the current iterations to be 0;
- updating the particle swarm: updating the speed and position of the historical best point of the particle swarm according to the historical best point of each particle;
- updating the particle swarm convergence value: reperforming the convergence value calculation on the particle swarm, wherein during the calculation, if the convergence value of the l-th particle is lower than the current optimal value of the l-th particle, the position of the historical best point is updated to the current particle position, and if not, the position of the historical best point remains unchanged, wherein after the calculation of all the particle convergence values is completed, the best point of the particle swarm is updated to the position of the smallest particle in all the current particle convergence values, and the worst point of the particle swarm is updated to the position of the largest particle in all the current particle convergence values, wherein the number of current iterations is increased by one;
- judging the termination conditions: setting termination conditions as follows:

$$\lambda(P_{w,g}) > \lambda(P_{b,g}) + \varepsilon \text{ and } I_c < I_{max}$$

$$I_c < I_{min}$$

wherein $\lambda(P_{b,g})$ and $\lambda(P_{w,g})$ respectively represent a final convergence value obtained in the convergence value calculation when the best point and the worst point of the particle swarm are used as Lagrange multiplier initial values, wherein $\varepsilon$ represents the tolerance, wherein $I_c$ represents the number of iterations, wherein $I_{max}$ and $I_{min}$ respectively represent the set maximum number of iterations and the minimum number of iterations, wherein after the update completed, the termination conditions are judged, and if one of the conditions is satisfied, it indicates that the search process is not completed, and then returns to the particle swarm to continue the iteration, wherein if none of the above two conditions is satisfied, it indicates that the search process is completed, and meanwhile, the best point of the current particle swarm is output as the optimal Lagrange multiplier initial value.

9. The method for coordinated control of an electric vehicle having independent four-wheel driving and steering of claim 1, wherein an additional yaw moment is generated in an average distribution manner, wherein according to the optimal additional yaw moment control variable input $u^*_2(k)$ obtained by solving the optimization problem, the torque allocated to each motor is obtained as follows;

$$\Delta T_{cfl}(k) = \Delta T_{crl}(k) = -\frac{u^*_2(k)\Delta M_{max}}{d}R_e \quad (1)$$

$$\Delta T_{cfr}(k) = \Delta T_{crr}(k) = \frac{u^*_2(k)\Delta M_{max}}{d}R_e$$

wherein $\Delta T_{cfl}$, $\Delta T_{crl}$ wherein respectively represent the additional torques of the left front wheel and the rear wheel, wherein $\Delta T_{cfr}$, $\Delta T_{crr}$ respectively represent the additional torques of the right front wheel and the rear wheel, wherein represents the maximum value of the additional yaw moment, wherein $R_e$ represents the effective rolling radius of the wheel, and wherein d represents the width of the vehicle body.

10. The method for coordinated control of an electric vehicle having independent four-wheel driving and steering of claim 1, wherein obtaining the desired active rear wheel steering angle according to the desired lateral force control variable, comprising the steps of:
- constructing a wheel lateral force MAP chart according to the wheel model, wherein the three axes in the MAP chart respectively represent the wheel lateral force, the wheel side slip angle and the vertical load,
- obtaining a corresponding wheel side slip angle by using a look-up-table method according to the vertical load of the wheel and the desired wheel lateral force, and obtaining a desired active rear wheel steering angle:

$$\delta_{r,ref} = \beta - \frac{L_r}{V}\gamma - \alpha_{r,ref}$$

where $\beta$ represents the mass center side slip angle of the vehicle, wherein $L_r$ represents the distance from the rear axle to the vehicle mass center, wherein V represents the longitudinal speed of the vehicle, wherein $\gamma$ represents the yaw velocity of the vehicle, and wherein $\alpha_{r,ref}$ represents the desired rear wheel side slip angle obtained by using the look-up table method.

* * * * *